United States Patent
Gadiwan (10) Patent No.: US 11,545,310 B2
(45) Date of Patent: Jan. 3, 2023

(54) HIGH CAPACITANCE COMPOSITES

(71) Applicant: GEGADYNE ENERGY LABS PVT LTD., Thane (IN)

(72) Inventor: Ameya Gadiwan, Mumbai (IN)

(73) Assignee: GEGADYN ENERGY LABS PVT LTD, Thane (IN)

( * ) Notice: Subject to any disclaimer, the term of this patent is extended or adjusted under 35 U.S.C. 154(b) by 333 days.

(21) Appl. No.: 16/757,925

(22) PCT Filed: Apr. 17, 2018

(86) PCT No.: PCT/IN2018/050224
§ 371 (c)(1),
(2) Date: Apr. 21, 2020

(87) PCT Pub. No.: WO2019/087204
PCT Pub. Date: May 9, 2019

(65) Prior Publication Data
US 2020/0343054 A1   Oct. 29, 2020

(30) Foreign Application Priority Data

Oct. 31, 2017   (IN) .............................. 201721038696

(51) Int. Cl.
| | |
|---|---|
| *H01G 11/38* | (2013.01) |
| *C01B 32/19* | (2017.01) |
| *C01B 21/06* | (2006.01) |
| *H01G 11/86* | (2013.01) |

(52) U.S. Cl.
CPC ......... *H01G 11/38* (2013.01); *C01B 21/0605* (2013.01); *C01B 32/19* (2017.08); *H01G 11/86* (2013.01); *C01P 2006/12* (2013.01); *C01P 2006/40* (2013.01)

(58) Field of Classification Search
CPC ......... H01G 11/38; H01G 11/86; H01G 11/32
See application file for complete search history.

(56) References Cited

U.S. PATENT DOCUMENTS

| | | |
|---|---|---|
| 9,437,369 B2 | 9/2016 | Miller |
| 9,734,954 B2 | 8/2017 | Lai et al. |

FOREIGN PATENT DOCUMENTS

| | | | |
|---|---|---|---|
| CN | 103021662 A | 4/2013 | |
| EP | 2871154 A1 * | 5/2015 | ............. C01B 31/02 |

OTHER PUBLICATIONS

Zhao et al., "Graphitic Carbon Nitride/Graphene Hybrids as New Active Materials for Energy Conversion and Storage," Chem NanoMat 2015, 1, 298-318.
Chen et al., "Catalyst-Free Growth of Three-Dimensional Graphene Flakes and Graphene/g-C3N4 Composite for Hydrocarbon Oxidation," ACS Nano 2016, 10, 3, 3665-3673.
Pech et al., "Ultrahigh-power micrometre-sized supercapacitors based on onion-like carbon," Nature Nanotechnology 5, 651-654 (2010).
Xia et al., "Measurement of the quantum capacitance of graphene," Nature Nanotechnology 4, 505-9 (2009.

\* cited by examiner

*Primary Examiner* — Eric W Thomas
(74) *Attorney, Agent, or Firm* — Kramer & Amado, P.C.

(57) ABSTRACT

A composite with high energy storage capacity for use in energy storage devices includes graphene and mesoporous graphitic carbon nitride (mc@g-$C_3N_4$). The graphitic carbon nitride is coated on mesoporous carbon (mc@g-C3N4) at a concentration ranging from 3% to 33%. The graphitic carbon nitride is obtained from condensation of mesoporous carbon and urea or a precursor thereof. Electrodes may be prepared from the composite. High energy high power storage devices such as the Electric Double Layer Capacitor (EDLC) may be fabricated with these electrodes.

20 Claims, 5 Drawing Sheets

HIGH CAPACITANCE COMPOSITES

FIELD OF THE INVENTION

The present disclosure relates to a composite with high energy storage capacity in energy storage devices comprising graphene, graphitic carbon nitride coated on to mesoporous carbon (mc@g-$C_3N_4$—) and to the process for preparation thereof. The present invention further relates to electrodes employing the said composition and fabrication of high energy high power storage devices such as the Electric Double Layer Capacitor (EDLC) with these electrodes.

BACKGROUND OF THE INVENTION

As one of the important solutions to global warming and environmental pollution problems, practical use of high-efficiency and pollution-free energy storage devices has been attracting much attention. EDLCs are energy storage systems which are able to store and deliver energy at relatively high rate which is far beyond many batteries. They have intrinsic long cycle life owing to their method of storing energy, unlike batteries which store chemical energy, electrostatically.

EDLCs have attracted attention as energy storage devices because they bridge the gap between conventional capacitors and batteries, offering higher energy density than conventional capacitors and higher power density than batteries. Despite these advantages, however, EDLC energy density is quite low, when compared to batteries and increasing energy density poses a key challenge in EDLC research.

An EDLC can be used in a wide range of applications including energy capture and storage and are used as a primary power source or in combination with batteries. They are able to operate in a wide thermal window allowing their use in extreme applications. This ability enable EDLCs very useful in cases where reliability and long life is a concern. One possible application is to bridge the gap between power failure and backup power generator start-up. Another application would be use in data centres as an on demand extremely fast and reliant UPS. Another application is in powering of Electric Vehicles as a secondary high power output torque generator or as a complete primary power source addressing the high amount of time required to charge the current conventional lithium ion based batteries.

Activated Carbon has been utilized as a high surface area electrode material ever since the development of the EDLC. Today, it is the most prominent material used in EDLC owing to its low cost, availability, and long history of use. However, high surface area alone does not guarantee high specific capacitance. If it is possible to get very high specific capacitance with an electrode material, it means that the entire surface area is accessible to the electrolyte. This is called pore accessibility. In the past, activated carbon, carbon black, aerogels, carbon fibers and glassy carbon have been used as electrode material for EDLCs. The use of CNTs as Supercapacitor electrodes has been reported in prior art.

Graphene is a one atom-thick planar sheet of $sp^2$ hybridized carbon atom that are densely packed in a honeycomb crystal lattice. This material in particular is remarkably strong for its very low weight and it conducts heat(about 5 KW/m·K) and electricity (electron mobility of 200,000 $cm^2$·V/s) with great efficiency. Graphene ideally has a surface area of 2630 $m^2$/g. Its important advantage is high conductivity >17000 S/m compared to activated carbon. The intrinsic capacitance of SLG was reported to be ~21 uF/$cm^2$ [J. Xia, F. Chen, J. Li, N. Tao, Nat. Nanotechnol. 4, 505 (2009)]. This sets the upper limit for EDLCs based on graphene, in principle, at as high as ~550 F/g if their entire surface area could be used.

Graphene initially is a two-dimensional carbon material. The 2D structure of graphene improves charging and discharging. Charge carriers in vertically oriented sheets can quickly migrate into or out of the deeper structures of the electrode, thus increasing current capability.

Although these graphene based materials have shown excellent power density and life cycle stability, their specific capacitance still falls far below the theoretical values of 550 F/g calculated for SLG.

A variety of other graphene based materials derived from Graphene oxide (GO) have also been used, yet the values of specific capacitance, energy density, and power density have remained lower than expected. It is attributed to the restacking of graphene sheets during its processing as a result of the strong sheet to sheet Van Der Waals interaction. This reduction in the specific surface area of graphene accounts for the overall low capacitance. In addition, these EDLC exhibit relatively low charge/discharge rates, this precludes their use for high-power applications.

In particular, the production of mechanically robust graphene electrodes with large thickness and high surface to volume ratio in a binder-free process would result in a high power and high energy density EDLC [D. Pech et al, Nat. Nanotechnol. 5, 651 (2010)].

Another article titled "Catalyst-Free Growth of Three-Dimensional Graphene Flakes and Graphene/g/C3N4 Composite for Hydrocarbon Oxidation", (DOI: 10.1021/acsnano.6b00113) reports a quartz powder derived CVD growth of 3D high quality graphene flakes. The article also demonstrates the fabrication and application of graphene/g-C3N4 composites.

Some of the patent documents disclose the use of graphene in the EDLCs. For example, U.S. Pat. No. 9,437,369 describe a capacitor device that includes graphene material on the conductive substrate; charge-storage material amid the graphene material; and an electrolyte. The conductive substrate, the graphene material, and the charge-storage material are separated into more than two electrodes, with gaps between respective pairs of adjacent of the electrodes.

Another U.S. Pat. No. 9,734,954 discloses a composite comprising a conducting polymer arranged on a graphene-based material and method thereof. The graphene based material is doped with nitrogen. With this composition, the energy storing mechanism takes place in EDLCs.

Review article titled 'Graphitic Carbon Nitride/Graphene Hybrids as New Active Materials for Energy Conversion and Storage' by Yang Zhao et. al published in Chem Nano-Mat 2015, 1, 298-318 reviews advances in the fabrication and application of g-$C_3N_4$/graphene hybrids as electro- or photocatalysts and electrode materials. g-$C_3N_4$ has been proposed as a replacement for graphite in lithium batteries wherein g-$C_3N_4$ can act as graphite with the highest N-doping possible. The article does not indicate the use of g-$C_3N_4$ alone as a material that could potentially be used in a Supercapacitor. The mention of capacitance in the article is only in context of "hydrogen evolution reaction" and the capacitance of "g-$C_3N_4$ nanoribbon-G" [where G represents graphene] has been tested only to the extent of finding out the quantum of active surface area for hydrogen evolution.

In order to improve the energy storage capacity in energy storage devices, the present invention describes a novel composition as described hereinafter.

SUMMARY OF INVENTION

It is therefore a primary objective to provide a composite with high energy storage capacity useful in high capacitance energy storage devices and to the process for preparation thereof.

Another objective is to provide electrode of said composite with high energy storage capacity in high capacitance energy storage devices.

The other objective of the present invention is to design and fabricate High Energy Density Electric Double Layer Capacitance (EDLC) with electrode of said present composite that along with its fast charge and discharge rates can have a high energy density.

Accordingly, the present invention provides a composite with high energy storage capacity for energy storage devices comprising;
  i. graphene at a concentration ranging from 65% to 95%;
  ii. graphitic carbon nitride coated on to mesoporous carbon (mc@g-$C_3N_4$) at a concentration ranging from 3% to 33%.

In another aspect, the composite of the present invention comprises a binder at a concentration ranging from 1.5 to 2%.

In yet another aspect, the graphene and graphitic carbon nitride on to mesoporous carbon (mc@g-$C_3N_4$) in the composite of the present invention has average surface area ranging from about 150 $m^2/g$ to about 1800 $m^2/g$.

In another aspect, the carbon precursor for mesoprous carbon is selected from soft template carbons like glucose, fructose, and other soluble carbon sources or hard template carbons like starch, biomass, and the like with predefined structure.

In yet another aspect, the binder is selected from a group consisting of but not limited to polyvinylpyrrolidone (PVP), Polyvinyl butyral (PVB), carboxymethyl cellulose (CMC), cellulose acetate, Nano Fibrillated Cellulose (NFC), styrene butadiene rubber (SBR), Polyvinylidene fluoride (PVDF), Chitin alone or combination thereof In another aspect, the present invention provides a process for preparation of the said composite with high energy storage capacity comprising;
  i. mechanical exfoliation of graphitic flakes to obtain non-oxidized pristine graphene flakes;
  ii. polymeric condensation of N-rich urea precursor with mesoporous carbon in 9:1 ratio in aqueous solution followed by calcination to obtain graphitic carbon nitride coated on to mesoporous carbon (mc@g-$C_3N_4$);
  iii. sonicating the active material of step (i) and step (ii) to obtain composite of graphene and graphitic carbon nitride coated on to mesoporous carbon (mc@g-$C_3N_4$).

In an aspect of the process, the graphene in step (i) is obtained by mechanical exfoliation of graphitic flakes in a solvent, optionally in presence of surfactant. The solvent for the process is a non-polar or polar protic or aprotic solvent alone or in combination thereof.

The surfactant is selected from a group consisting of Sodium dodecylbenzenesulfonate (SDBS), sodium dodecyl sulfate (SDS), Pyrene, Sodium dioctyl sulfosuccinate (SDOS), polyvinyl pyrrolidone (PVP), carboxy methyl cellulose (CMC), NanoFibrillated Cellulose (NFC) and the like to disperse the graphite powder.

The graphitic flakes used in step (i) may be synthetic or natural graphite with mesh size ranging from 200 mesh to 2500 mesh, preferably from 200 mesh to 1000 mesh, more preferably from 200 mesh to 1500 mesh; most preferably from 200 to 500 mesh.

In another aspect, the mesoporous carbon in step (ii) is prepared from the carbon precursor selected from either soft template carbons like glucose, fructose, and other soluble carbon sources or hard template carbons like starch, biomass, and the like which have a predefined structure.

The graphitic carbon nitride coated on to mesoporous carbon (mc@g-$C_3N_4$) is highly stable in both acidic and alkaline environment has high surface area and low volumetric mass density which results in the superior performance of the supercapacitor.

In an aspect, the composite of graphene and graphitic carbon nitride coated on to mesoporous carbon (mc@g-$C_3N_4$) may further be homogenized with a binder using same or different solvent used during polymeric condensation to obtain composite slurry.

In another aspect, the present invention discloses the electrodes formed from the composite of the present invention which comprises the current collectors with a first layer of highly conductive graphitic carbon and a second layer of graphene, graphitic carbon nitride coated on to mesoporous carbon (mc@g-CN) and a binder. In yet another aspect, the present invention provides high energy density double layer capacitor (EDLC) comprising;
  i. at least a pair of electrodes each comprising current collectors with a first layer of highly conductive graphitic carbon and a second layer of composite of graphene, graphitic carbon nitride coated on to mesoporous carbon (mc@g-CN) and a binder;
  ii. separator along the length of the electrodes; and
  iii. an electrolyte with a redox couple.

In an aspect, the electrolyte is selected from the group of aqueous electrolytes such as Sodium Sulphate, Sodium Hydroxide, Sulphuric Acid, Potassium Hydroxide, Potassium Chloride, Potassium Nitrate, Sodium acetate, Potassium Sulphate, Zinc Sulphate or from the group of organic electrolytes such as TEABF4, [BMIM] [BF4], [EMIM] [BF4], [EMIM] [EtSO4]; or the electrolyte is Deep Eutectic Solvent (DES) of mixture of Choline chloride and Ethane diol (Ethaline), mixture of Choline chloride and Urea (Reline), mixture of Choline chloride and methyl urea, mixture of Choline chloride and glycerol and such like with a redox couple. Preferably, the electrolyte comprises Deep Eutectic Solvent consisting mixture of Choline chloride and Ethane diol (Ethaline) with a redox couple of ferricyanide and ferrocyanide.

In yet another aspect the present invention discloses a method for fabricating EDLCs which comprises;
  i. Preparing the composite of graphene, graphitic carbon nitride coated on to mesoporous carbon (mc@g-$C_3N_4$) and a binder;
  ii. Preparing the electrode assemblies by coating the micro etched current collectors, coated with a highly conductive nano-graphitic carbon, with composite of graphene, graphitic carbon nitride coated on to mesoporous carbon (mc@g-$C_3N_4$) and a binder;
  iii. Calendering of electrodes of step (iii);
  iv. Introducing separator between the assemblies and stacking them in a particular alternate fashion to improve overall packing efficiency;
  v. Impregnating the final electrode assembly with electrolyte of Deep Eutectic solvent (DES) with redox couple under dry environment; and
  vi. Sealing the impregnated EDLC assembly under vacuum to obtain the EDLC.

In an aspect of the present disclosure, the current collector is selected from aluminium foil, copper foil, stainless Steel foil, Flexible Graphite Foil or Lead foil with thickness ranging from about 5 microns to about 80 microns.

In still another aspect of the present disclosure, the electrode comprising of active material and current collector has a collective thickness ranging from about 20 microns to about 100 microns.

In still another aspect of the present disclosure, the current collector comprises a tab attached to the conducting foils and ultrasonically welded to ensure optimum current and power delivery.

In still another aspect of the present disclosure, the impregnated EDLC is sealed using a vacuum thermal sealer to seal the last remaining edge.

These and other objects, embodiments and advantages of the present disclosure will become readily apparent to those skilled in the art from the following detailed description of the embodiments having reference to the attached figures, the disclosure not being limited to any particular embodiments disclosed.

BRIEF DESCRIPTION OF THE DRAWINGS

For a better understanding of the embodiments of the systems and methods described herein, and to show more clearly how they may be carried into effect, reference will now be made, by way of example, to the accompanying drawing, wherein.

DETAILED DESCRIPTION OF INVENTION

Exemplary embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in this art. The terminology used in the detailed description of the particular exemplary embodiments illustrated in the accompanying drawings is not intended to be limiting. In the drawings, like numbers refer to like elements.

As used herein below and above the terms 'Supercapacitor' and 'Electric double layer Capacitor (EDLC)' are equivalent.

The figures depict a simplified structure only showing some elements and functional entities, all being logical units whose implementation may differ from what is shown. The connections being logical units whose implementation may differ from what is shown. The connections shown are logical connections; the actual physical connections may be different. It is apparent to a person skilled in the art that the structure may also comprise other functions and structures.

In a preferred embodiment, the present invention relates to a composite with high energy storage capacity for high energy storage devices comprising;
  i. graphene at a concentration ranging from about 65% to about 95%,
  ii. graphitic carbon nitride coated on to mesoporous carbon (mc@g-$C_3N_4$) at a concentration ranging from about 3% to about 33%.

The graphene and the graphitic carbon nitride coated on to mesoporous carbon (mc@g-$C_3N_4$) in the composite of the present invention has surface area ranging from about 150 $m^2/g$ to about 1800 $m^2/g$.

In another embodiment, the carbon precursor for mesoprous carbon is selected from soft template carbons like glucose, fructose, and other soluble carbon sources or hard template carbons like starch, biomass, and the like with predefined structure.

In another embodiment, the mesoporous carbon may be in micronized form with a particle size ranging between 5-20 um.

In another embodiment, the composite of the present invention may further comprise a binder selected from a group comprising polyvinylpyrrolidone (PVP), Polyvinyl butyral (PVB), Polyvinyl alcohol (PVA), Polyvinyl acetate (PVAc), Carboxymethyl cellulose (CMC), mixture of styrene butadiene rubber and sodium carboxymethyl cellulose (SBR+CMC), NanoFibrillated Cellulose (NFC), Cellulose acetate, Polyvinylidene fluoride (PVDF), Chitin alone or in combination thereof at a concentration ranging from 1.5-2.0%.

In another embodiment, the present invention relates to a process for preparation of said composite with high energy storage capacity comprising;
  i. mechanical exfoliation of graphitic flakes to obtain non-oxidized pristine graphene flakes;
  ii. polymeric condensation of N-rich urea precursor with mesoporous carbon in 9:1 ratio in aqueous solution followed by calcination to obtain graphitic carbon nitride coated on to mesoporous carbon (mc@g-$C_3N_4$);
  iii. sonicating the active material of step (i) and step (ii) followed by evaporation to obtain composite of graphene and graphitic carbon nitride coated on to mesoporous carbon (mc@g-$C_3N_4$).

The exfoliation of graphitic flakes in step (i) is carried out in presence of solvent, optionally in presence of surfactant. The process ensures high yield of graphene.

The graphitic flakes may be synthetic or natural graphite with mesh size ranging from 200 mesh to 2500 mesh, preferably from 200 mesh to 1000 mesh, more preferably from 200 mesh to 1500 mesh; most preferably from 200 to 500 mesh.

The solvent is selected from non-polar or polar protic or aprotic solvent such as n-hexane, water, ethanol, methanol, IPA, acetone, DMF, NMP and the like alone or combination thereof so as to maintain the mass fractions of the material being processed.

The surfactants in step (i) are selected from a group consisting of Sodium dodecylbenzenesulfonate (SDBS), sodium dodecyl sulfate (SDS), Pyrene, Sodium dioctyl sulfosuccinate (SDOS), polyvinyl pyrrolidone (PVP), carboxy methyl cellulose (CMC), NanoFibrillated Cellulose (NFC) and the like to disperse the graphite powder.

In another embodiment, the mesoporous carbon in step (ii) is prepared from the carbon precursor selected from either soft template carbons like glucose, fructose, and other soluble carbon sources or hard template carbons like starch, biomass, and the like which have a predefined structure.

In another embodiment, the mesoporous carbon may be micronized to obtain a particle size ranging between 5-20 um.

In an embodiment, the composite of graphene and graphitic carbon nitride coated on to mesoporous carbon (mc@g-$C_3N_4$) may further be homogenized with a binder using same or different solvent used during polymeric condensation to obtain a slurry of the composite.

The process for preparation of the composite of the present invention is detailed herein below:

According to step (i), commercially available high quality 200-2500 mesh natural or synthetic graphite flakes or the micronized powder form is added to a solvent mixture of water and non-polar or polar protic or aprotic solvents such as n-hexane, ethanol, methanol, IPA, acetone, DMF, NMP and the like alone or in combination thereof, optionally in presence of surfactants selected from Sodium dodecylbenzenesulfonate (SDBS), sodium dodecyl sulfate (SDS), Pyrene, Sodium dioctyl sulfosuccinate (SDOS), polyvinyl pyrrolidone (PVP), carboxy methyl cellulose (CMC), Nano-Fibrillated Cellulose (NFC) and the like to disperse the graphite powder. The pH of the mixture was adjusted in the range of 12-13 using a base. The graphite flakes is maintained in the suspension until a pitch black solution containing graphene flakes is obtained with no loss in concentration.

Graphitic carbon nitride is a polymeric material with properties similar to graphite. It is a layered material. g-$C_3N_4$ was synthesized from N-rich Urea as the precursor and highly mesoporous carbons which are added to act as templates for the polymer condensation.

The mesoporous carbon is obtained from the carbon precursor selected from either soft template carbons like glucose, fructose, and other soluble carbon sources or Hard template carbons like starch, biomass, etc which have a predefined structure. In an embodiment, the mesoporous carbon for step (ii) is obtained from the suitable carbon precursor by a process which comprises first carbonization of the carbon precursor either by pyrolysis or hydrothermal carbonization followed by chemical activation involving single step of calcination to obtain extremely porous carbons. The pyrolysis is carried out at a temperature suitable to obtain carbon or carbon containing residues from the said carbon precursors.

The hydrothermal carbonization of suitable carbon precursors comprises heating the soluble carbon precursor to a temperature in the range of 170-200° C. in a Teflon lined stainless steel sealed jars available commercially.

In an alternate embodiment, the suitable carbon precursor is directly chemically activated involving single step calcination.

The activating agents for chemical activation are selected from KOH, $CaCl_2$, $ZnCl_2$ and the like.

The mesoporous carbon comprising of mesopores and micropores has a surface area greater than 1400 m$^2$/g determined by BET.

After chemical activation, residual chemicals which may be present on or in the carbon, are rinsed first with mineral acid and then excessively with deionized water. This process leads to water/moisture being trapped in the pores of activated carbon which are removed by vacuum drying.

In an embodiment, the mesoporous carbon may be micronized in a ball mill for about 20 hours to get consistent particle size ranging between 5-20 um.

In another embodiment the mesoporous carbon or the micronized mesoporous carbon is added to a saturated aqueous urea solution in 1:9 ratio and the mixture is sonicated in an ultrasonic bath (150 W) for about 120 minutes. This is followed by calcination at a temperature ranging from 450-550° C. for about 5-7 hours to obtain graphitic carbon nitride coated on to mesoporous carbon (mc@g-$C_3N_4$). The powder is then put in the ball mill to break up any agglomerates and sifted through a 10 micron mesh to obtain the final fine powder with density in the range of 0.1-0.2 g/cm$^3$.

The graphitic carbon nitride coated on to mesoporous carbon (mc@g-$C_3N_4$) is stable in both acidic and alkaline environment, exhibits high surface area and low volumetric mass density which results in the superior performance of the super capacitor.

In step (iii) of the process, the active materials of step (i) and step (ii) are sonicated for about 60 minutes in solution to form composites of graphene and graphitic carbon nitride coated on to mesoporous carbon (mc@g-$C_3N_4$).

In yet another embodiment, the present invention provides composite slurry which comprises homogenizing the said composite of graphene and graphitic carbon nitride coated on to mesoporous carbon (mc@g-$C_3N_4$) with a binder in suitable solvent to obtain the slurry with a net mass content of 20-30% of active materials to solvent. This slurry is either evaporated or added with more solvent to get a consistent viscosity.

The binder is selected from a group comprising polyvinylpyrrolidone (PVP), Polyvinyl butyral (PVB), Polyvinyl alcohol (PVA), Polyvinyl acetate (PVAc), Carboxymethyl cellulose (CMC), mixture of styrene butadiene rubber and sodium carboxymethyl cellulose (SBR+CMC), NanoFibrillated Cellulose (NFC), Cellulose acetate, Polyvinylidene fluoride (PVDF), Chitin alone or in combinations thereof. In another embodiment, the present invention discloses the electrodes formed from the composite of the present invention which comprises the current collectors with a first layer of highly conductive graphitic carbon and a second layer of graphene, graphitic carbon nitride coated/loaded on to mesoporous carbon (mc@g-CN) and a binder.

Accordingly, the current collector selected from aluminium foil, copper foil, stainless Steel foil, Flexible Graphite Foil or Lead foil with thickness ranging from about 5 microns to about 80 microns is coated with a highly conductive graphite carbon. The layer acts as a barrier to the electrolyte interaction with collectors in high energy devices which generally lead to corrosion. This is followed by loading the said layer with the composite of graphene, graphitic carbon nitride coated on to mesoporous carbon (mc@g-$C_3N_4$) or the composite slurry of graphene, graphitic carbon nitride coated on to mesoporous carbon (mc@g-$C_3N_4$) and binder using a technique selected from the group comprising of, but not limited to, drop casting, roller doctor blade coating and microgravure roller coating and combinations thereof. A thickness ranging from about 10 um to about 100 um is maintained on top of the current collector. Forced drying of the slurry is induced using a method selected from the group comprising of Infrared Lamps, Hot Air, Forced Air, Air curtains and combinations thereof. The foil is advanced through the above mentioned drying techniques at a preset rate to maintain the consistency.

In an embodiment, the total drying of the solvents in the composite slurry, when used, is avoided as it resulted in flaking. The solvent concentration ranging from about 0.1% to about 5% of the original coating is maintained to prevent the problem of flaking.

Further, the electrodes are compressed to get a uniform coating with improved conductivity using a calendaring machine. A compression ratio ranging from about 99% to about 60% was maintained.

In still another embodiment of the present disclosure, the electrode comprising of active material and current collector has a collective thickness ranging from about 20 microns to about 100 microns.

In still another embodiment of the present disclosure, the current collector comprises a tab attached to the conducting foils selected from aluminium foil, copper foil, stainless Steel foil, Flexible Graphite Foil or Lead foil and ultrasonically welded to ensure optimum current and power delivery.

In an embodiment, while devising a supercapacitor, tabs of the same or different material based on application are brought out of the cell to enable the cell to be utilized as energy storage device.

In one instance of the present invention, multiple electrodes with said current collectors coated/loaded with said composite slurry are joined together with the help of an ultrasonic welding machine. Thus, one supercapacitor cell may have multiple plates that increases the energy stored in one cell. One cell may effectively have only one cathode and one anode, but each of these has multiple plates to increase the active surface area.

The composite of the present invention is not restricted to the use in EDLCs. In still another embodiment of the present disclosure, the composite is for use in a component selected from group comprising electrodes, transistors, strain actuators, ultrasensitive gas sensors, conductive thin films, gas barriers and reinforcing plastics and composites.

In yet another embodiment, the present invention discloses High Energy Density Electric Double Layer Capacitance (EDLC) comprising;
  i. at least a pair of electrodes each comprising current collectors with a first layer of highly conductive graphitic carbon and a second layer of composite of graphene, graphitic carbon nitride coated on to mesoporous carbon (mc@g-CN) and a binder;
  ii. separator along the length of the electrodes; and
  iii. an electrolyte with a redox couple of ferrocyanide and ferricyanide.

In an embodiment, the electrolyte is selected from the group of aqueous electrolytes such as Sodium Sulphate, Sodium Hydroxide, Sulphuric Acid, Potassium Hydroxide, Potassium Chloride, Potassium Nitrate, Sodium acetate, Potassium Sulphate, Zinc Sulphate or from the group of organic electrolytes such as TEABF4, [BMIM] [BF4], [EMIM] [BF4], [EMIM] [EtSO4]; or the electrolyte is Deep Eutectic Solvent (DES) of mixture of Choline chloride and Ethane diol (Ethaline), mixture of Choline chloride and Urea (Reline), mixture of Choline chloride and methyl urea, mixture of Choline chloride and glycerol and such like with a redox couple. Preferably, the electrolyte comprises Deep Eutectic Solvent consisting mixture of Choline chloride and Ethane diol (Ethaline) with a redox couple of ferrocyanide and ferricyanide.

The Deep Eutectic solvent (DES) with the redox couple improves the capacitance, electrochemical performance of high energy storage devices, micropore assessibility thereby improving the working range of EDLC ranging from as low as −40° C. to as high as 270° C.

In an embodiment, the composite along with DES electrolyte in the EDLC provides high potential window with high energy density, provides fast charge and discharge rates without any corrosive effect.

In an embodiment, the present invention provides Deep Eutectic solvent (DES) as electrolyte in high energy devices comprising mixture of Choline chloride and Ethane diol (Ethaline), mixture of Choline chloride and Urea (Reline), mixture of Choline chloride and methyl urea, mixture of Choline chloride and glycerol and such like with a redox couple of potassium ferricyanide and potassium ferrocyanide in 1:1 molar ratio.

The concentration of each of the redox couple of potassium ferricyanide and potassium ferrocyanide ranges from 4-8 mM/L.

In another embodiment, the Deep Eutectic solvent (DES) is prepared by heating hydrogen donor selected from Ethanediol, Urea, Methyl Urea and Glycerol and the like to a temperature of about 80-90° C. To this is added hydrogen acceptor selected from choline chloride (CC). The ratio of hydrogen acceptor to hydrogen donor is 1:2. The mixture is stirred until a deep eutectic solvent is liquid at room temperature, kept overnight at about 80° C. to drive off any excess water. A redox couple of potassium ferricyanide ($K_3Fe(CN)_6$) and potassium ferrocyanide ($K_4Fe(CN)_6$) in ratio 1:1 is induced into the electrolyte. The concentration of the redox couple is in the range of 4-8 mM/Leach.

In yet another embodiment, the present disclosure relates to a method for fabricating EDLCs, wherein said method comprises;
  i. Preparing the composite of graphene, graphitic carbon nitride coated on to mesoporous carbon (mc@g-$C_3N_4$) and a binder;
  ii. Preparing the electrode assemblies comprising coating the micro etched current collectors with a first layer of highly conductive nano-graphitic carbon and a second layer with composite of graphene, graphitic carbon nitride coated on to mesoporous carbon (mc@g-C3N4) and a binder;
  iii. Calendering the electrodes of step (iii);
  iv. Introducing separator between the assemblies and stacking them in a particular alternate fashion to improve overall packing efficiency;
  v. Preparing Deep Eutectic Solvent (DES) electrolyte employing redox-couple mechanism;
  vi. Impregnating the final electrode assembly with said electrolyte of step (v) under dry environment; and
  vii. Sealing the impregnated EDLC assembly under vacuum to obtain the EDLC.

In an embodiment, the composite of step (i) comprises graphene at a concentration ranging from about 65% to about 95%, graphitic carbon nitride coated on to mesoporous carbon (mc@g-$C_3N_4$) at a concentration ranging from about 3% to about 33% and the binder at a concentration ranging from 1.5-2.0%.

The composite has a surface area ranging from about 150 $m^2/g$ to about 1800 $m^2/g$. In yet another embodiment of the present disclosure, the current collector in step (ii) is selected from aluminium foil, copper foil, stainless Steel foil, Flexible Graphite Foil or Lead foil with thickness ranging from about 5 microns to about 80 microns.

In still another embodiment of the present disclosure, the electrode comprising of active material and current collector has a collective thickness ranging from about 20 microns to about 100 microns.

In still another embodiment of the present disclosure, the current collector comprises a tab attached to the conducting foils and ultrasonically welded to ensure optimum current and power delivery.

In an embodiment, the EDLC device contains symmetrical electrodes placed facing each other for a total thickness along with separator ranging from about 50 microns to about 220 microns.

In still another embodiment of the present disclosure, the impregnated EDLC is sealed using a vacuum thermal sealer to seal the last remaining edge.

In an embodiment of the present disclosure, the Supercapacitor has a high specific capacitance ranging from about 140 F/g to about 300 F/g.

In an embodiment of the present disclosure, the EDLC shows a higher energy density value ranging from 50 Wh/kg to 235 Wh/kg depending upon the operating temperature.

In an embodiment of the present disclosure, the EDLC has a power density ranging from about 200 W/kg to about 140 KW/kg.

In an embodiment, charging of the cell reduces ferricyanide anion to ferrocyanide, and discharging oxidizes the ferrocyanide anion back to ferricyanide.

In still another embodiment of the present disclosure, the composite of the present invention has a bulk resistivity ranging from about 4 $\Omega$/cm to about 2200 $\Omega$/cm and a calendared sheet resistance ranging from 1.6 $\Omega/cm^2$ to about 35 $\Omega/cm^2$.

In an embodiment, the low resistance of the composite of the present invention provides faster charging and discharging rate of the capacitor (EDLC).

In yet another embodiment, the EDLC's retained 98% of its capacity over 1000+ cycles.

In an embodiment of the present disclosure, some of the key advantages of the method, the prepared electrodes and EDLCs produced from the composition are:

1) The EDLCs depict higher energy density.
2) The EDLCs depict higher pore accessibility.
3) The EDLCs depict higher specific capacitance.
4) The EDLCs have a reasonable operating voltage.
5) Raw materials like graphite and urea used in the methods of the present disclosure are inexpensive and abundant.
6) The end product is made at room temperature and thus is economical.
7) The method of the present disclosure is scalable to large scale production.
8) The method employed to produce graphene yields non-oxidized pure exfoliated graphene increasing it performance.
9) The method eliminates use of any hazardous chemicals as it is a purely mechanical process.
10) This makes the whole process of production of these EDLCs green.
11) The EDLCs in the present disclosure are biodegradable and safe as they do not employ any hazardous chemicals in the final product.

Some of the terms used in the present disclosure are defined below and are to be construed to have the same scope and meaning throughout the specification.

In an embodiment of the present disclosure, 'capacitance' is the ability of a body to store electric charge. The amount of electrical energy stored in a capacitor is referred to as capacitance and has the unit of Faradays (F).

In an embodiment of the present disclosure, 'specific capacitance' is the capacitance of the EDLC per unit mass of active material. The unit is F/g.

The resistance in series to the capacitance in an equivalent circuit of a practical EDLC is known as Equivalent Series Resistance (ESR) having units in Ohms.

In still another embodiment of the present disclosure, the total amount of energy that can be extracted from an EDLC per unit mass of the active material is called 'Energy Density' having units in Wh/kg.

In still another embodiment of the present disclosure, the total amount of energy that can be transferred in a unit time in an EDLC per unit mass of the active material is called 'Power Density' having units in KW/kg.

In an embodiment, the present invention provides a composite with high energy storage capacity for energy storage devices and successful method for fabrication and production of a high energy density EDLC capable of replacing batteries while retaining power density and long cycle life. The method in the present disclosure is hence applicable in mass manufacturing of robust high density EDLCs for use on the Commercial, Military as well as Industrial environments.

Experimental:

EXAMPLE 1

Preparation of the Composite

Example 1a

Synthesis of Graphene Using Mechanical Exfoliation 10 grams of 2000 mesh graphite was added per litre of solvent mixture of water and ethanol in 10:1 (v/v) ratio. pH was adjusted to 12-13 by addition of sodium hydroxide. The graphite was kept in suspension and stirred until a pitch black solution containing 1-2 layers of graphene flakes were obtained. The graphene remained in suspension even after 4 weeks with negligible loss in concentration. A concentration of 0.92 mg/ml was determined at the end of 4 weeks.

Example 1b

Synthesis of Mesoporous Carbon by Chemical Activation

The carbon precursor was mixed with KOH in 1:1 molar ratio and calcined to a temperature of 980° C. The residual chemicals present on or in the carbon were rinsed with HCl (35%; 200 ml) followed by rinsing excessively with deionized water (2000 ml) to obtain mesoporous carbon.

BET Surface area: >1400 $m^2$/g.

Example 1c

Synthesis of Graphitic Carbon Nitride Coated on to Mesoporous Carbon (mc@g-$C_3N_4$)

Mesoporous carbon of step 1b was micronized in a ball mill for 20 hours to obtain particle size between 5-20 um. 90 g Urea was then mixed with 10 g of micronized mesoporous carbon powder. 60 mL water was added to make a saturated urea solution. This mixture was then sonicated in an ultrasonic bath (150 W) for 120 minutes. The resulting solution was then calcinated at 520° C. for 360 minutes to obtain the mc@g-$C_3N_4$. The material showed itself as a very low density high volume material. The powder was put in the ball mill to break up any agglomerates and sifted through a 10 micron mesh to obtain the final fine powder for use in the electrode. The final density was 0.16 g/$cm^3$.

Example 1d

Preparation of Composite

The graphene of example 1a (66%) and graphitic carbon nitride coated on to mesoporous carbon (mc@g-$C_3N_4$) of example 1c (34%) were sonicated for 60 minutes until formation of the composite.

Example 1e

Preparation of Composite Slurry 1 g of the composite of step 1d was mixed with 5.25 grams of ethanol containing PVP+PVB[1:2 w:w] as the binder. The mixture was homogenized to obtain the slurry with a net mass content of 20% of active materials to solvent. The slurry was either evaporated or added with more solvent to get a consistent viscosity.

EXAMPLE 2

Fabrication of EDLCs

Example 2a

Synthesis of Graphene Using Mechanical Exfoliation 10 grams of 2000 mesh graphite was added per litre of solvent mixture of water and ethanol in 10:1 (v/v) ratio. pH was adjusted to 12-13 by addition of sodium hydroxide. The graphite was kept in suspension and stirred until a pitch black solution containing 1-2 layers of graphene flakes were obtained. The graphene remained in suspension even after 4 weeks with negligible loss in concentration. A concentration of 0.92 mg/ml was determined at the end of 4 weeks.

Example 2b

Synthesis of Mesoporous Carbon by Chemical Activation

The carbon precursor was mixed with KOH in 1:1 molar ratio and calcined to a temperature of 105° C. The residual chemicals present on or in the carbon were rinsed with HCl (35%; 200 ml) followed by rinsing excessively with deionized water (2000 ml) to obtain mesoporous carbon.

BET Surface area: >1400 $m^2$/g.

Example 2c

Synthesis of Graphitic Carbon Nitride Coated on to Mesoporous Carbon (mc@g-$C_3N_4$)

Mesoporous carbon of step 1b was micronized in a ball mill for 20 hours to obtain particle size between 5-20 um. 90 g Urea was then mixed with 10 g of micronized mesoporous carbon powder. 60 mL water was added to make a saturated urea solution. This mixture was then sonicated in an ultrasonic bath (150 W) for 120 minutes. The resulting solution was then calcinated at 520° C. for 360 minutes to obtain the mc@g-$C_3N_4$. The material showed itself as a very low density high volume material. The powder was put in the ball mill to break up any agglomerates and sifted through a 10 micron mesh to obtain the final fine powder for use in the electrode. The final density was 0.16 g/$cm^3$.

Example 2c

Preparation of Composite

The graphene of example 1a (80%) and graphitic carbon nitride coated on to mesoporous carbon (mc@g-$C_3N_4$) of example 1c (20%.) were sonicated for 60 minutes until formation of the composite.

Example 2d

Preparation of Composite Slurry 1 g of the composite of step 2c was mixed with 5.25 grams of ethanol containing PVP+PVB[1:2 w:w] as the binder. The mixture was homogenized to obtain the slurry with a net mass content of 20-30% of active materials to solvent. The slurry was either evaporated or added with more solvent to get a consistent viscosity

Example 2e

Micro-Etching of Al Foil

Prior to the deposition of active material, the Al current collectors (20 um thick) were etched with the etchant solution of 100 ml water, 1 g NaCl and 1 g $CuSO_4$ to obtain micro etched surface devoid of aluminium oxide. The micro etched foil was further washed with deionized water.

Example 2f

Preparation of Electrodes

The micro etched Al foil was coated with highly conductive nano graphitic carbon. 1.5 mg/$cm^2$ of the composite slurry of example 2d (i.e. 15 mg of the material) was loaded on the electrode area of 10 $cm^2$ by drop casting. The slurry was forced dried using infrared lamps at a preset rate of 1 meter per minute at 80° C. to maintain consistency. Complete drying of the solvents was avoided as it resulted in flaking. The solvent content ranging from about 0.1% to about 5% of the original coating was maintained to prevent the problem of flaking.

Example 2g

Calendaring of Electrodes

The electrodes of example 2f were compressed to obtain a uniform coating with improved conductivity using a calendaring machine. A compression ratio ranging from about 99% to about 60% was maintained.

Example 2h

Preparation of Redox Induced Deep Eutectic Solvent (DES)

Choline chloride (CC) was dried under vacuum at 80° C. overnight. Dried Choline chloride (CC) (139.62 g) and Ethanediol (124.14 g) were weighed and mixed. The mixture was heated to 85° C. for 1 hour. 0.008 moles/litre of redox additive were prepared by addition of 294 mg of potassium ferrocyanide and 263 mg of potassium ferricyanide and added to 100 ml of choline chloride and ethanediol DES to obtain redox induced DES.

Example 2i

Fabrication of EDLCs

The said EDLCs were assembled by first stacking the electrodes in an alternate fashion using a continuous length of separator between all plates. This stack was then sealed permanently on three sides of the pouch cell [prismatic] construction and one side was left unsealed for addition of electrolyte. The redox induced DES electrolyte was thoroughly degassed before addition to the cell. After addition to cell, it was vacuum sealed to allow the electrolyte to wet and penetrate all the pores of the active material.

Electrode and Device Characteristics:
Area: 1 cm$^2$
Active material loading: 1.5 mg/cm$^2$
Current Collector: Aluminium 12 micron thickness
Separator: 100 gsm paper (10 mg/cm$^2$)

The capacitance of each device was calculated from the galvanostatic curves at different current densities using the formula:

$$C_{SC}=i/(-dV/dt)$$

Where 'I' is the current applied (in Ampere), and dV/dt is the slope of the discharge curve.

Specific capacitance were calculated based on the area or the volume of the device stack according to the following formulae:

$$\text{Areal Capacitance}=C_{SC}/A$$

$$\text{Volumetric Stack Capacitance}=C_{SC}/V$$

Where, A and V refer to the area and volume of the constructed EDLC. The power of each device was calculated from the galvanostatic curves at different charge/discharge current densities using the formula:

$$P_{SC}=(OV)^2/4R_{ESR}V$$

Where $P_{SC}$ is the power, OV is the operating voltage window and V is the volume of the said stack. $R_{ESR}$ is the internal resistance of the device which can be estimated from the $V_{drop}$ at the beginning of the discharge at a fixed current density(i) using $$R_{ESR}=V_{drop}/2i$$

The energy density was calculated using $$E_{SC}=C_{V@SC}x(OV)^2/(7200) \text{ in Wh/cm}^3$$

Cv@sc is the volumetric stack capacitance as calculated above.

Figure 1:
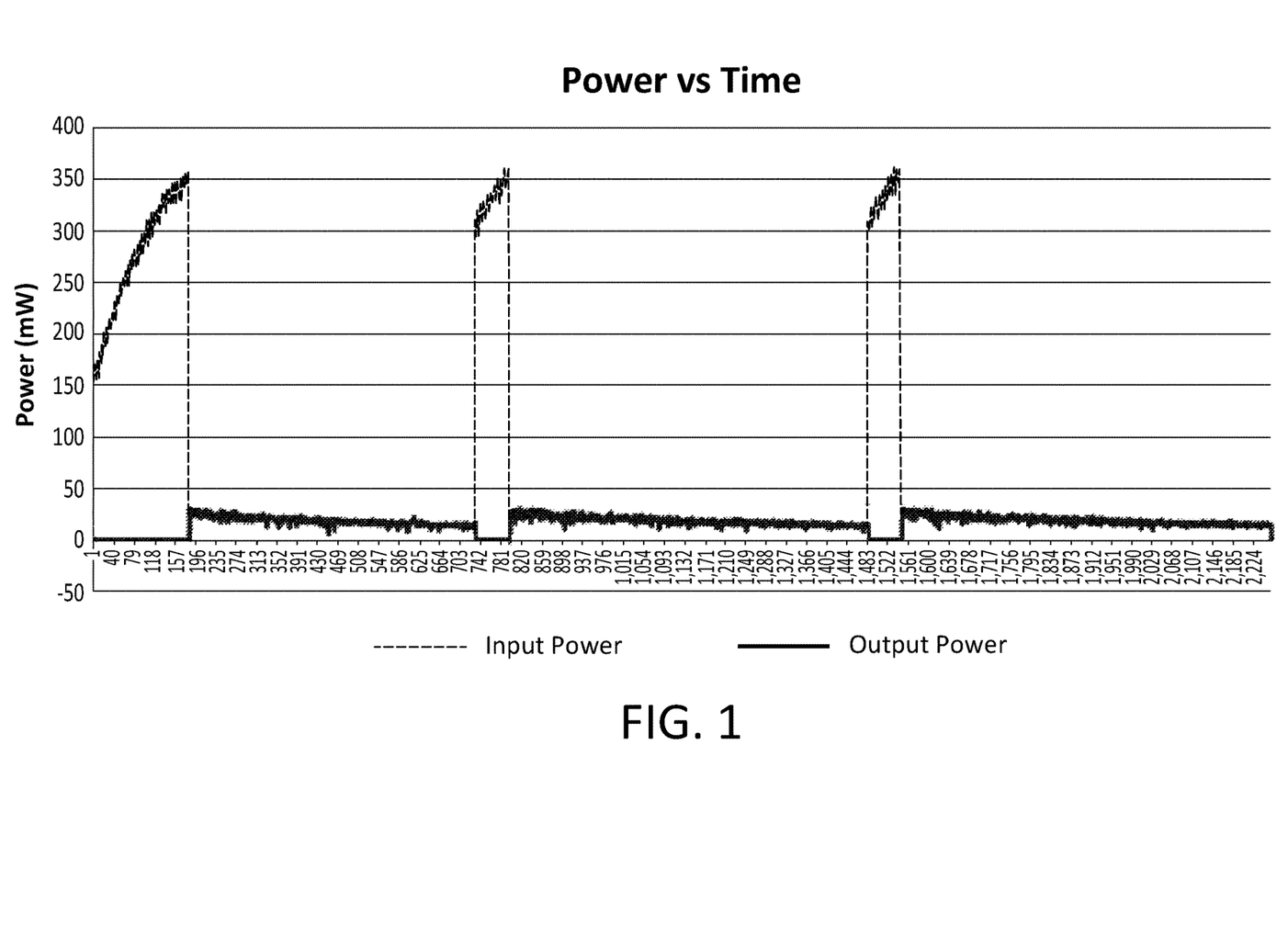
FIG. 1 illustrates the graph of Power vs time of the EDLC.

The Graph of Charge and discharge of the cell in terms of instantaneous power delivered to and by the cell vs time in seconds was plotted as shown in FIG. 1. The cell constructed with 30 mg of active material and was able to charge within 60 s and discharge for 700 seconds across a 45 mA load. The cell provided close to 3.8 mWh of energy.

Figure 2:
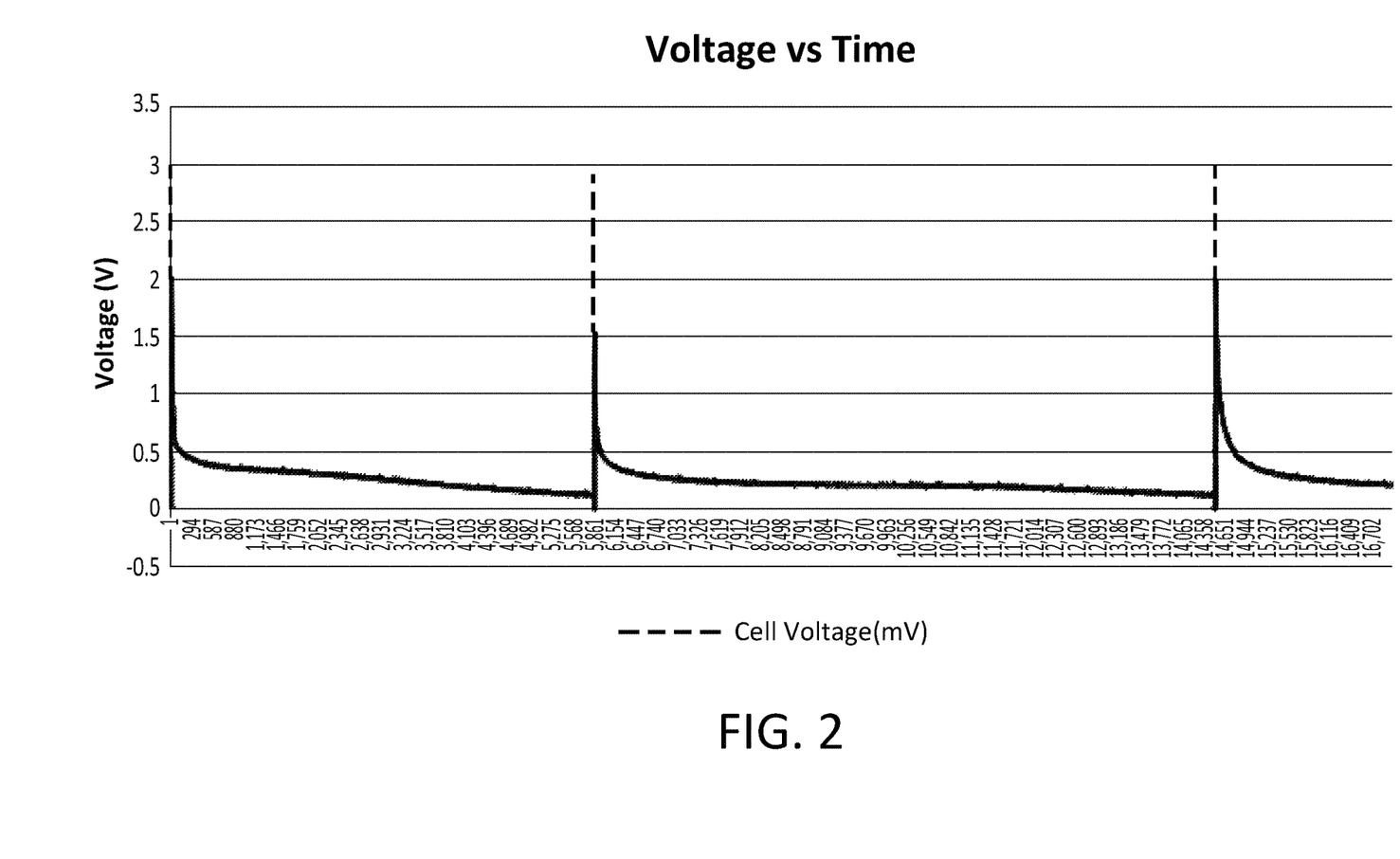
FIG. 2 illustrates the self-discharge test of EDLC. Cell was tested for Self-discharge and leakage currents. The cell showed exceptionally low self-discharge, discharging slowly over a period of 2 hrs and 24 minutes.

The cell was tested for Self-discharge and leakage currents. The cell showed exceptionally low self-discharge, discharging slowly over a period of 2 hrs and 24 minutes (FIG. 2).

Figure 3:
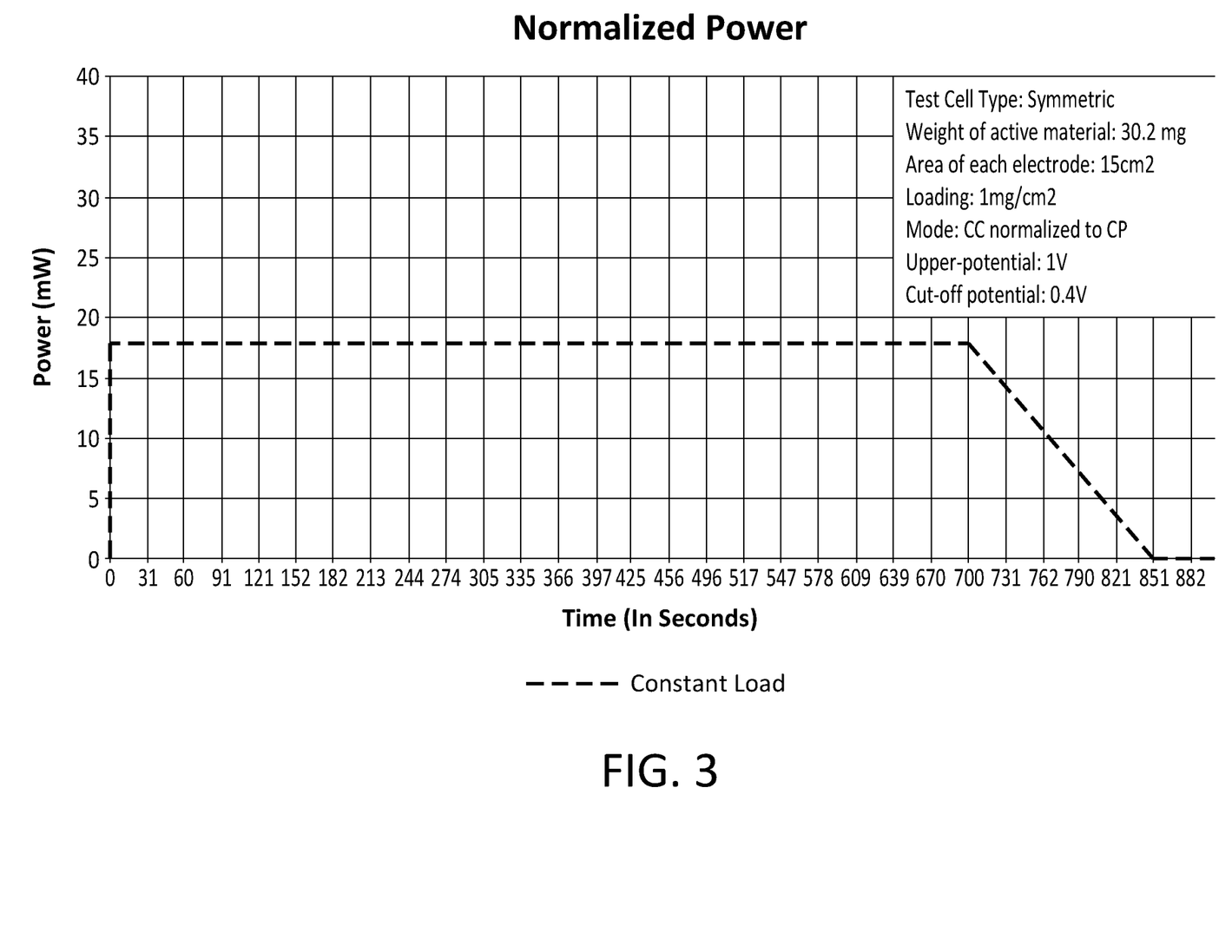
FIG. 3 illustrates the normalized power of the EDLC with electrode of present composite. The graph signifies the energy and performance of the device in constant power mode.
Figure 4:
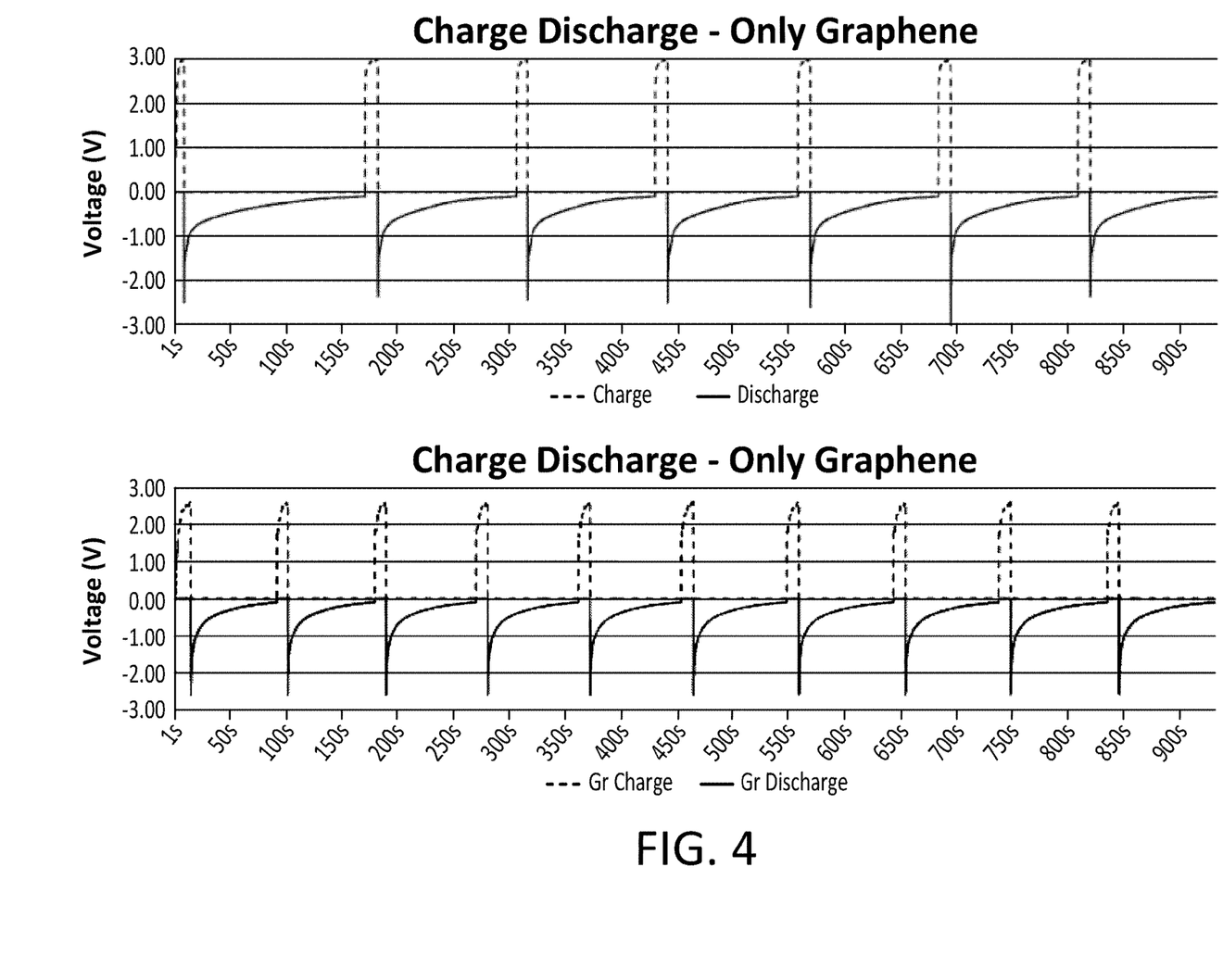
FIG. 4 illustrates the comparative charge-discharge rate of the composite vs. the pure graphene.
Figure 5:
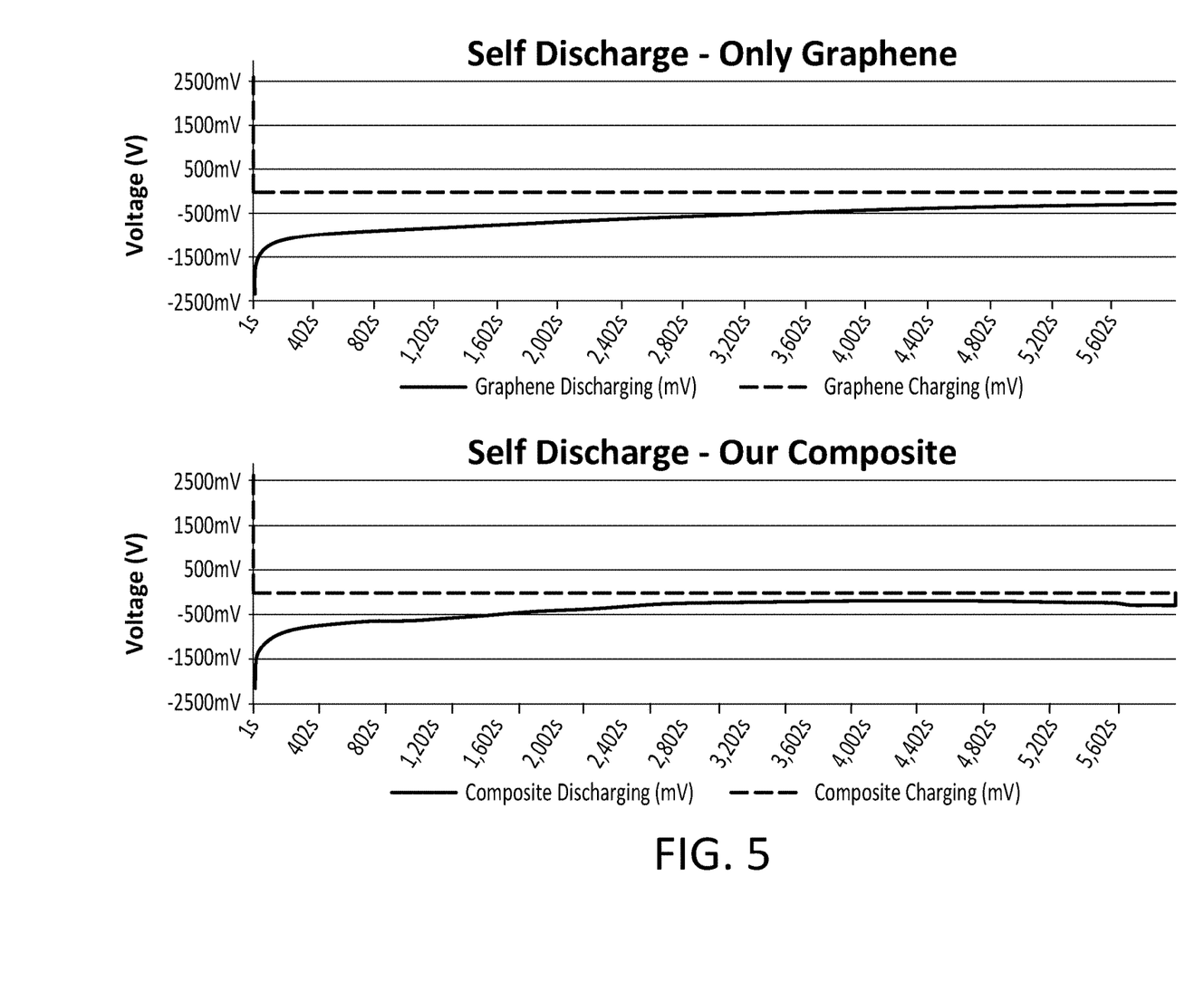
FIG. 5 illustrates the comparative self-discharge of the composite vs. the pure graphene.

The comparative FIG. 3 and FIG. 4 illustrate that the composite has better stability and has enhanced power and energy density and supercapacitance in comparison to graphene alone.

The device shows excellent equivalent series resistance (ESR) characteristics for the constructed cell.

It will be apparent to those having ordinary skill in this art that various modifications and variations may be made to the embodiments disclosed herein, consistent with the present disclosure, without departing from the spirit and the scope of the present disclosure. Other embodiments consistent with the present disclosure will become apparent from consideration of the specification and the practice of the description disclosed herein.

I claim:

1. A composite with high energy storage capacity for high energy storage devices comprising;
    i. graphene at a concentration ranging from 65% to 95%;
    ii. graphitic carbon nitride coated on to mesoporous carbon (mc@g-C$_3$N$_4$) at a concentration ranging from 3% to 33%, the graphitic carbon nitride being obtained from condensation of urea or a precursor thereof and mesoporous carbon.

2. The composite as claimed in claim 1, wherein the composite comprises a binder at a concentration ranging from 1.5 to 2%.

3. The composite as claimed in claim 2, wherein the binder is selected from the group consisting of polyvinylpyrrolidone (PVP), polyvinyl butyral (PVB), carboxymethyl cellulose (CMC), cellulose acetate, nanofibrillated cellulose (NFC), styrene butadiene rubber (SBR), polyvinylidene fluoride (PVDF), chitin, and mixtures thereof.

4. The composite as claimed in claim 1, wherein the composite has a surface area ranging from 150 m$^2$/g to 1800 m$^2$/g.

5. The composite as claimed in claim 1, wherein the mesoporous carbon is prepared from a template carbon with a predefined structure.

6. The composite as claimed in claim 1, wherein the mesoporous carbon is prepared from a template carbon selected from the group consisting of:
    a soft template carbon selected from the group consisting of glucose, fructose, soluble carbon sources, and mixtures thereof; and
    a hard template carbons selected from the group consisting of starch, biomass, and mixtures thereof.

7. A process for preparation of the composite as claimed in claim 1, comprising:
    i. mechanically exfoliating graphitic flakes to obtain non-oxidized graphene flakes;
    ii. condensing a urea precursor with mesoporous carbon in an aqueous solution, followed by calcination to obtain graphitic carbon nitride coated on a mesoporous carbon as a calcination product; and
    iii. sonicating the non-oxidized graphene flakes of step (i) and the calcination product of step (ii), followed by evaporation to obtain the composite comprising graphene and graphitic carbon nitride coated on to mesoporous carbon (mc@g-C$_3$N$_4$).

8. The process as claimed in claim 7, wherein the mesoporous carbon is prepared from a template carbon selected from the group consisting of:
    a soft template carbon selected from the group consisting of glucose, fructose, soluble carbon sources, and mixtures thereof; and
    a hard template carbons selected from the group consisting of starch, biomass, and mixtures thereof.

9. The process as claimed in claim 7, wherein the process further comprises homogenizing the composite of graphene and graphitic carbon nitride coated on mesoporous carbon (mc@g-C$_3$N$_4$) with a binder in a solvent to obtain a composite slurry with a content of 20-30% by mass of the composite.

10. The process as claimed in claim 9, wherein the binder is selected from the group consisting of polyvinylpyrrolidone (PVP), polyvinyl butyral (PVB), carboxymethyl cellulose (CMC), cellulose acetate, nanofibrillated cellulose (NFC), styrene butadiene rubber (SBR), polyvinylidene fluoride (PVDF), chitin, and mixtures thereof.

11. An electrode, comprising;
   i. a microetched current collector;
   ii. a first layer of conductive graphitic carbon on the microetched current collector; and
   iii. a second layer on the first layer, the second layer comprising graphitic carbon nitride coated on to mesoporous carbon (mc@g-C$_3$N$_4$) at a concentration ranging from 3% to 33%, the graphitic carbon nitride being obtained from condensation of urea or a precursor thereof and mesoporous carbon.

12. The electrode as claimed in claim 11, wherein:
   the current collector is made from a material selected from the group consisting of aluminum foil, copper foil, stainless steel foil, flexible graphite foil, and lead foil; and
   the current collector has a thickness ranging from 5 microns to 100 microns.

13. A High Energy Density Electric Double Layer Capacitor (EDLC), comprising;
   i. at least two electrodes, each electrode being an electrode as claimed in claim 11;
   ii. a separator along the length of the electrodes; and
   iii. an electrolyte comprising:
      a. a deep eutectic solvent (DES) selected from the group consisting of a mixture of choline chloride and ethanediol, a mixture of choline chloride and urea, a mixture of choline chloride and methyl urea, and a mixture of choline chloride and glycerol; and
      b. a redox couple.

14. The High Energy Density Electric Double Layer Capacitor (EDLC) as claimed in claim 13, wherein the second layer of the electrode comprises a binder selected from the group consisting of polyvinylpyrrolidone (PVP), polyvinyl butyral (PVB), carboxymethyl cellulose (CMC), cellulose acetate, nanofibrillated cellulose (NFC), styrene butadiene rubber (SBR), polyvinylidene fluoride (PVDF), chitin, and mixtures thereof.

15. The High Energy Density Electric Double Layer Capacitor (EDLC) as claimed in claim 14, wherein:
   the deep eutectic solvent comprises a mixture of choline chloride and ethanediol, and
   the redox couple comprises ferrocyanide and ferricyanide in a 1:1 molar ratio.

16. The High Energy Density Electric Double Layer Capacitor (EDLC) as claimed in claim 14, wherein the current collector in the electrode is made from a material selected from the group consisting of aluminum foil, copper foil, stainless steel foil, flexible graphite foil, and lead foil.

17. The High Energy Density Electric Double Layer Capacitor (EDLC) as claimed in claim 14, wherein the combined thickness of the electrodes and the separator ranges from 50 microns to 220 microns.

18. The High Energy Density Electric Double Layer Capacitor (EDLC) as claimed in claim 14, wherein the EDLC has at least one of:
   a specific capacitance ranging from about 50 F/g to about 300 F/g;
   an energy density ranging from about 65 Wh/kg to about 150 Wh/kg; and
   a power density ranging from about 200 W/kg to about 140 KW/kg.

19. A method of making the High Energy Density Electric Double Layer Capacitor (EDLC) as claimed in claim 14, comprising;
   i. preparing a composite slurry of:
      graphene and graphitic carbon nitride coated on mesoporous carbon (mc@g-C$_3$N$_4$), and
      a binder;
   ii. preparing at least two electrode assemblies by coating microetched current collectors with a first layer of highly conductive nanographitic carbon and a second layer of a composite of the mc@g-C$_3$N$_4$ and the binder;
   iii. calendaring the electrode assemblies of step (ii);
   iv. introducing the separator between two electrode assemblies and stacking the electrode assemblies and the separator in an alternate fashion to obtain an EDLC assembly;
   v. impregnating the EDLC assembly with an electrolyte comprising the deep eutectic solvent (DES) and the redox couple; and
   vi. sealing the impregnated EDLC assembly under vacuum to obtain the EDLC.

20. The method as claimed in claim 19, wherein:
   the deep eutectic solvent comprises a mixture of choline chloride and ethanediol, and
   the redox couple comprises ferrocyanide and ferricyanide in a 1:1 molar ratio.

* * * * *